Dec. 8, 1931.   W. BARCLAY   1,835,840
AUTOMOBILE BODY
Filed May 29, 1929   2 Sheets-Sheet 1
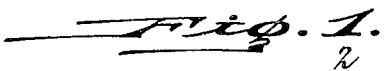
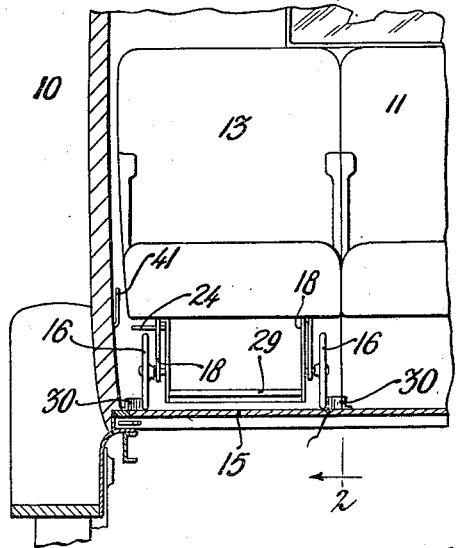
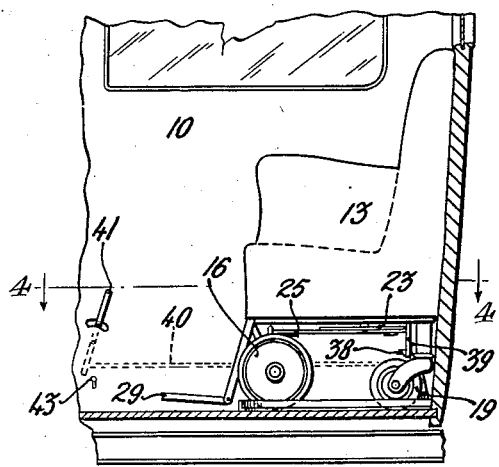
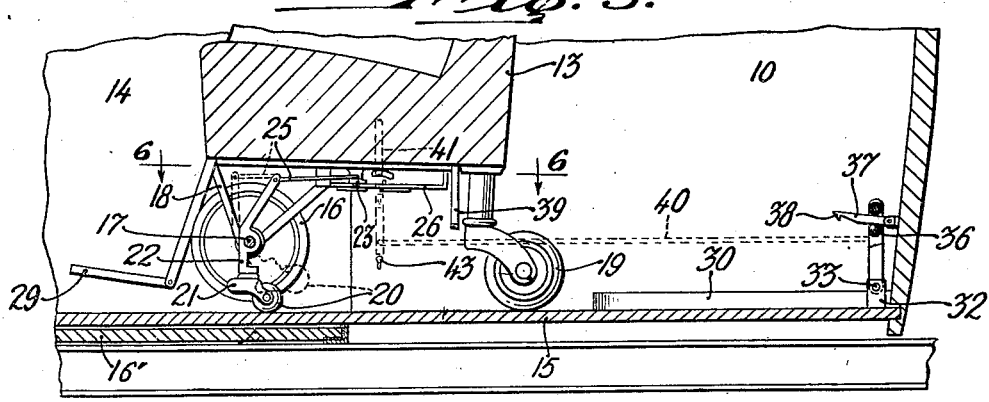
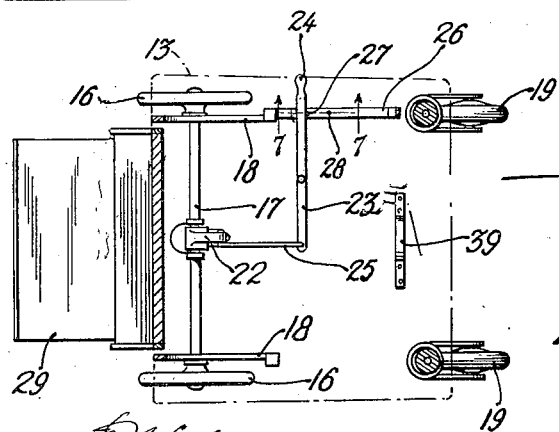
WRIGHT BARCLAY, INVENTOR
BY Victor J. Evans, ATTORNEY

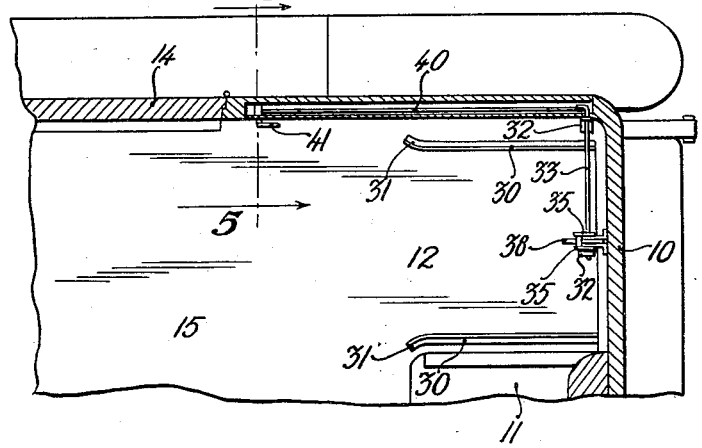
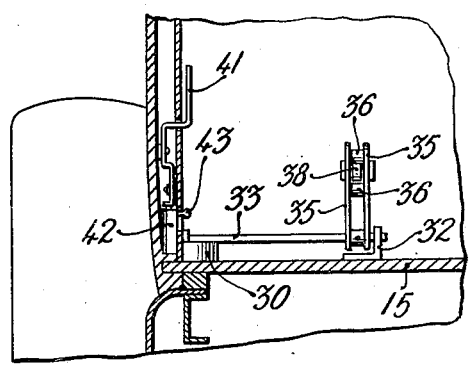
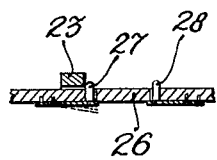
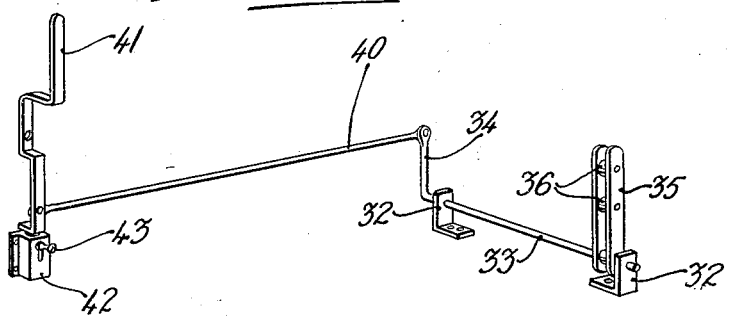

Patented Dec. 8, 1931

1,835,840

UNITED STATES PATENT OFFICE

WRIGHT BARCLAY, OF NEW YORK, N. Y.

AUTOMOBILE BODY

Application filed May 29, 1929. Serial No. 366,997.

This invention relates to automobile bodies.

The primary object of this invention is to provide an automobile body with a removable seat capable of easy manipulation when rolling the same into and out of position therein with an occupant seated therein. This type of body will be found most useful for invalids, as it is unnecessary to lift the helpless person from the auto seat to a roll chair as is the usual practice, as the removable seat of the body is on wheels and may be rolled into and out of the body, and may be used separate from the body as a wheel seat when desired.

Another object of the invention resides in an automatic means for guiding a roll seat into its allotted space in an automobile body and for locking the same against rolling movement when in such parked position, and manually operable means within easy reach of an operator standing exteriorly of the body for releasing the locking means.

Another object of the invention is the provision of a roll seat having a fifth wheel movable into and out of contact with the ground when desired to enable the chair to be turned in a minimum amount of space, which is essential when manipulating the chair into and out of its position in the body of an automobile.

With these and other objects in view, the invention resides in certain novel construction and combination and arrangement of parts, the essential features of which are hereinafter fully described, are particularly pointed out in the appended claim, and are illustrated in the accompanying drawings, in which:—

Figure 1 is a fragmentary vertical transverse sectional view through my improved auto body showing the removable seat in position therein.

Figure 2 is a vertical longitudinal sectional view on the line 2—2 of Figure 1.

Figure 3 is a view similar to Figure 2 but showing the removable chair rolled out of its parking space and with the fifth wheel in contact with the ground.

Figure 4 is a horizontal sectional view on the line 4—4 of Figure 2.

Figure 5 is a detail vertical sectional view on the line 5—5 of Figure 4.

Figure 6 is a detail horizontal sectional view on the line 6—6 of Figure 3.

Figure 7 is an enlarged detail vertical sectional view on the line 7—7 of Figure 6.

Figure 8 is a detail perspective view of the chair lock actuating mechanism.

Referring to the drawings by reference characters, the numeral 10 designates a portion of an automobile body having a fixed passenger seat 11 which terminates in spaced relation to one of the sides of the body to provide a parking space 12 for a removable seat 13. The body is provided with a swingable door 14 and slidably mounted beneath the floor 15 of the body in alignment with the side door or doors is a skid 16' fully shown and described in the aforementioned application. It is not believed necessary to go into detail as to the construction and operation of the skid, other than to mention that the same may be withdrawn from its horizontal position beneath the floor and swung to permit one end to rest upon the ground at which time the skid is at an incline bridging the ground and the floor of the auto body to allow the removable chair to be rolled thereover in a manner to be hereinafter explained.

The removable seat 13 may be constructed of a design and material as to be in keeping with the interior of the auto-body and is mounted upon fixed rotatable front wheels 16 mounted on a transverse shaft 17, which shaft is supported by brackets 18 depending from the underside of the seat. A pair of swivel wheels 19 are provided at the rear of the seat to permit easy swinging of the rear of the chair during rolling of the same.

For facilitating manipulation of the chair in a minimum amount of space, I provide an auxiliary wheel 20 which when in a lowered position contacts with the ground and jacks the front wheels 16 off the ground so that only the wheels 19 and 20 support the chair. The wheel 20 is of a type similar to the wheels 19 and the same is journalled in a weighted bracket 21, swivelly mounted in an arm 22 pivoted on the shaft 17. To swing the auxiliary wheel 20 to an inoperative position as shown in dotted lines in Figure 3 and for supporting the same in such position, I pivot a horizontal lever 23 to the underside of the seat, the manipulating end 24 of which terminates at the outer side of the seat as best seen in Figures 1 and 6. The inner end of the lever 23 is connected to the arm 22 by a link 25. A hanger bracket 26 is attached to the underside of the seat through which the outer end of the lever 23 extends and which bracket carries spaced resiliently mounted pins 27 and 28. When the lever is moved to a position to engage the pin 27, the same is locked against movement with the auxiliary wheel in operative or lowered position, whereas when moved past the pin 28 to engage the same, the said pin acts as a stop for preventing the weighted fifth wheel from dropping to the ground. The resiliently mounted pins being located near the manipulating handle 24 may be easily actuated before the handle and with the same hand of an operator that operates the said handle.

For the convenience of an occupant, the roll seat may be provided with a foot rest 29 and other accessories may also be embodied in the chair as would adapt the same for the same comforts as a conventional invalid roll chair which are not capable of being received in the back of the present automobile bodies.

Parallel guide rails 30 are fixed to the floor in the parking space 12 and have their outer ends flared or curved outward as at 31. When the seat is approximately aligned with the parking space 12 and rolled backward, the guide rails 30 effect a true backward movement of the seat which is essential for the actuation of the seat locking means now to be described.

Journalled in angle brackets 32 fixed to the floor at the rear of the space 12 is a transverse rock shaft 33 having a right angularly bent arm 34. Fixed to the shaft 33 is a pair of spaced plates 35 having spaced rollers 36 journalled therebetween. Pivoted to the rear wall of the body centrally of the space 12 is a latch 37 which extends between the spaced rollers 36. The hooked end 38 of the latch is in the path of a keeper 39 carried by the underside of the seat so as to engage the latch when the seat is in parked position. To actuate the catch or latch 37 to release the keeper, I provide a link 40, one end of which is pivotally connected to the arm 34 of the shaft 33, while the other end is pivoted to one side of the axis of an actuating lever 41. The lever 41 is located near the door 14 for access through the open door. To hold the latch 37 in a raised position to receive its coacting keeper, I lock the lever 41 in a vertical position by a finger actuated latch 42, the sliding bolt of which engages the lever which is released therefrom upon downward movement of a manipulating finger piece 43. By releasing the lever 41 by actuating the latch 42, and then swinging the lever rearward, the rollers 36 will force the pivoted latch 37 downward in locked engagement with its keeper 39, thus the seat is securely locked against such shocks as it may be subjected during ordinary travel of an automobile over a roadway. To unlatch the seat, the lever 41 is moved to the position shown in Figure 3 of the drawings, whereupon the latch is lifted free of the plane of its keeper and the seat may be rolled forward. The plates 35 and their rollers 36 form an actuator for the latch 37.

From the novel features herein shown and described, it will be seen that an invalid may be comfortably accommodated in the seat 13, and the said chair with the accupant remaining therein may be so manipulated as to be rolled down an inclined skid onto a pavement or ground, and when reaching the ground, the seat may serve the purpose of a roll seat, thus making it unnecessary to transfer the occupant.

While I have described what I deem to be the most desirable embodiment of my invention, it is obvious that many of the details may be varied without in any way departing from the spirit of my invention, and I therefore do not limit myself to the exact details of construction herein set forth nor to anything less than the whole of my invention limited only by the appended claim.

What is claimed as new is:—

In an automobile comprising a body and having therein a removable wheeled seat, which latter is provided with a keeper, means for releasably retaining the wheeled seat in a fixed position during travel of the automobile, said means including a pivotally movable latch for engaging said keeper, bearings rigid with said body and having a rod turnable therein, an arm carried by said rod, an actuator for said latch rigid with said rod, an operating lever pivotally mounted on said body, and link means pivotally connecting said arm and said lever, whereby on operating the latter said actuator is effective to move said latch for releasing the wheeled seat.

In testimony whereof I have affixed my signature.

WRIGHT BARCLAY.